United States Patent [19]

Johnson et al.

[11] Patent Number: 5,073,423

[45] Date of Patent: Dec. 17, 1991

[54] DECALCOMANIA

[75] Inventors: Ronald E. Johnson, Tioga, Pa.; Richard W. Thompson, Big Flats; Lung-Ming Wu, Horseheads, both of N.Y.

[73] Assignee: Corning Incorporated, Corning, N.Y.

[21] Appl. No.: 461,057

[22] Filed: Jan. 4, 1990

[51] Int. Cl.[5] .................. B32B 3/00

[52] U.S. Cl. .................. 428/40; 428/195; 428/423.1; 428/446; 428/447; 428/515; 428/908.8; 428/914; 428/213; 428/332; 428/335

[58] Field of Search .................. 428/40, 195, 423.1, 428/446, 447, 515, 908.8, 914, 213, 332, 335

[56] References Cited

U.S. PATENT DOCUMENTS 3,516,842 6/1970 Klinker et al. .................. 428/40
3,516,904 6/1970 Klinker, Jr. .................. 428/40
4,322,467 3/1982 Heimbach et al. .................. 428/209
4,568,403 2/1986 Egan .................. 156/289

OTHER PUBLICATIONS

CA 111(10):79504j, Oike & Co. Ltd., 12-8-88, JP 63302087.

*Primary Examiner*—Patrick J. Ryan
*Attorney, Agent, or Firm*—C. S. Janes, Jr.

[57] ABSTRACT

This invention is directed to the production of a laminated heat release or pressure release decal for application to a surface of an article which comprises:

(a) a support layer comprising a disposable release film;

(b) a stretchable abrasion resistant layer, and (c) a heat activated or pressure sensitive adhesive layer atop said abrasion resistant layer.

Where desired, a second support layer comprising a disposable release film can be located on the side opposite from the first support layer.

29 Claims, 1 Drawing Sheet

DECALCOMANIA

BACKGROUND OF THE INVENTION

This invention is founded in improvements in decalcomania, customarily called decals and, in particular, to stretchable heat release decalcomania which can be applied to surfaces of complex contours.

Decals used extensively in commerce for decorating glass and ceramic articles can be generally categorized into three groups or types depending upon their construction and their mode of application; viz., water slide-off, heat release, and cold or pressure release decals. Those decals have commonly been employed not only for applying designs and decorations to surfaces of articles, but also for applying continuous coatings that can serve either a decorative or a functional purpose.

The construction of the commercially available decals has limited their application to articles of relatively simple geometric shapes. That limitation becomes particularly restrictive where it is desired to apply a continuous, unbroken coating over a relatively broad surface area. Hence, it is extremely difficult to avoid developing wrinkles, air entrapment, distortions, and other physical defects which result from efforts to uniformly conform the coating to the surface of an article.

In a number of decals the underlying source of this shape limitation resides in the backing layer of carrier for the decal. To illustrate, where paper comprises the backing layer and it is necessary for that layer to remain in contact with the design layers during application of the decals, then it is apparent that this backing layer will severely restrict the ability of the decal to conform to article surfaces of complex geometries. Conventional heat release decals provide examples of that situation. Hence, their application is normally effected by lightly pressing the decal against a heated substrate, the heat therefrom activating an adhesive top coat to thereby cause the decal to adhere to an article surface, while concurrently melting a wax-based release layer to effect release of the backing layer. Pressure release decals are applied in a similar manner, but no heat is required because the top coat is a pressure sensitive adhesive and release of the backing layer is occasioned through the use of a silicone release coating on the surface of the backing layer. The use of a silicone release coating assures that the adhesion of the decal to the article surface will be greater than the adherence to the backing layer, thereby guaranteeing that complete transfer of the decal to the article surface can be accomplished.

One technique which has been devised to overcome the surface shape limitations encountered with conventional decals has involved a two-step process: first, transferring the design layer to a lower durometer silicone transfer pad; and then, second, transferring the design to the surface of an article by pressing the transfer pad with the design thereon against the article surface. That technique can be effected successfully if the materials of construction of the design layer are carefully selected to demonstrate not only the proper characteristics to hold the design together during transfer, but also sufficient flexibility to conform to the shape of the article surface, and a balanced adhesion between the pad and the article surface. That technique is not applicable, however, where a coating to perform an operational function is desired because it conventionally results in a wax release coating being under the decal after application thereof, that coating imparting extremely poor durability to the decal unless fired at high temperature to remove the wax, such as is done with ceramic and/or glass-containing decals where the ultimate design layer is to be a sintered or fused pigmented glass flux.

Another technique devised to overcome the surface geometry limitations experienced in the use of conventional decals utilizes a heat release decal of the type described in U.S. Pat. No. 4,477,510 (Johnson et al.) wherein the backing or carrier layer employed is a stretchable film, rather than relatively rigid paper. In that technique the film is stretched to conform to complex surface geometries and the decoration released under light pressure when brought into contact with the surface of an article and heat is applied to melt a wax release layer, thereby avoiding the need for high pressure during application.

As defined in that patent, the decals consisted of a three ply laminate: (a) a uniformly stretchable carrier or support; (b) a release layer deposited onto that carrier; and (c) a design layer or decoration deposited onto the release layer. The carrier and the decoration carried thereon can be stretched or otherwise shaped to conform the decoration to the geometry of the article. When the decal is brought into contact with the article and heat is applied, the decoration releases (separates) from the carrier and adheres to the article. The carrier is thereafter disposed of.

As defined more specifically, the decals of Johnson et al. consisted of a carrier or support formed form a disposable stretchable film of low density polyethylene, a release layer deposited onto the carrier formed from an organic wax, and a design layer deposited on the release layer as a cohesive film formed of a heat-processable thermoplastic ink having a melting point higher than that of the release layer. Each of the carrier, the release layer, and the design layer was prepared from materials which did not migrate into each other during formation of the decal and upon application of the decal to the article, and each of the release layer and the design layer was stretchable with the carrier.

As can be observed, this technique offers the distinct advantage in that the release wax is on the top surface of the decal after transfer such that, consequently, it does not interfere with the decal's durability for those applications wherein the decal will not be subsequently fired.

Whereas, in theory, there are pressure release decal equivalents to the above-described techniques for heat release decals, the pressure release decal approach has been found to be more difficult to effect successfully because of the requirement to formulate the design layer with pressure sensitive materials and to control precisely the properties of the silicone release material. This latter situation is especially difficult in the above-described technique utilizing an intermediate transfer pad inasmuch as the pad must exhibit an affinity for the decorating layer intermediate between that for the backing layer and that for the article surface. This situation is further complicated by the fact that the surface energy of the transferring pad, which energy dictates the adherence of the decorating layer, does not remain constant during continuous repeated process operation.

By being slid off the carrier layer (after soaking in water to dissolve the layer between the design layer and carrier) and then being conformed to the surface of the article by manually smoothing out the decal onto the surface of the article, water slide-off decals circumvent the problems inherently imposed by the backing or carrier layer in the heat sensitive and pressure sensitive decals. Nevertheless, water slide-off decals demand considerable skill when applying to articles of complex shapes, but work reasonably well in forming irregular patterns on articles of relatively simple geometric shapes. The ability to produce continuous coatings, however, is quite shape limited, inasmuch as it is extremely difficult to avoid the development of wrinkles, creases, distortion, etc. Furthermore, the lacquers customarily employed in the construction of water slide-off decals to maintain the design layers intact during application to the surface of an article comprise materials such as nitrocellulose, acrylics, cellulosics, etc., which demonstrate limited extensibility and, thereby, also further restrict the ability of the decal to conform to complex surface geometries.

In summary, all of the above-described decal constructions and application techniques suffer one or more shortcomings in the capability of transferring continuous functional coatings to articles of complex shape, i.e., coatings wherein the decals will not be subsequently fired. Those deficiencies become more obvious and even more restrictive where maintaining an optical surface quality on the article is required. Hence, to maintain optical quality, the transferred coating must be essentially defect-free, homogeneous, of uniform thickness, and have a smooth surface. To assure the latter characteristic, it has been found that only extremely smooth polymer films make satisfactory backing or carrier layers; paper, including coated paper, have been found to be unsatisfactory. Thus, the materials of decal construction and the application technique must be so devised that completely uniform transfer of the decal is attained with no optically unsatisfactory defects being introduced which could result from non-uniform film thickness, entrapped air, and the like.

GENERAL DESCRIPTION OF THE INVENTION

The present invention constitutes an improvement upon the decals disclosed in U.S. Pat. No. 4,477,510 and is particularly directed to heat release or pressure release decals capable of forming a uniform coating on the inside (concave) surface of ophthalmic lenses wherein, most desirably, the coating will be capable of being tinted. The inventive decals are laminated structures comprising three basic layers; (1) a support layer comprising a disposable release film; (2) a stretchable abrasion resistant layer; and (3) a heat activated or pressure sensitive adhesive layer atop the abrasion resistant layer. Optionally, another support layer comprising a disposable release film may be placed on the side of the decal opposite to the first support layer. Whereas the basic support layer may be utilized in contact with either the abrasion resistant layer or the adhesive layer, in the preferred practice it will be placed in contact with the adhesive layer to protect the adhesive from contamination prior to the application of the decal to a substrate. Application of the decal to the surface of an article is carried out by bringing the adhesive layer into contact with the article surface (the optionally present support layer being removed prior thereto) and then pressing a low durometer elastomeric pad against the top of the decal in a manner similar to that described in U.S. Pat. No. 4,477,510. By proper selection of transfer pad shape and durometer, the decal can be transferred without entrapping air between it and the surface of the article being coated or decorated therewith.

One illustration of a method for applying the inventive decals comprises two general steps:

First, the decal is pre-stretched with a conically-shaped elastomeric pad, thereby forming a pointed "nose". Accordingly, by bringing the pre-stretched decal into contact with the surface to be covered (for example, the concave surface of an ophthalmic lens), the "nose" makes the first contact.

Second, upon continued pressing, the soft elastomeric transfer pad, with properly selected shape and durometer, conforms to the shape of the lens curvature and displaces air away from the interface between the decal and the lens to eliminate air entrapment.

In general, the support layer in contact with the abrasion resistant layer will comprise an extremely smooth polymer film which may carry a release coating thereon. For example, a film of MYLAR®, a polyethylene terephthalate material marketed by E. I. DuPont de Nemours Company, Wilmington, Del., carrying a silicone release coating has proven very suitable. Such support layers have customarily had thicknesses of about 0.001"–0.02" (≈0.03–0.51 mm). For certain applications wherein the support layer in contact with the abrasion resistant layer is not removed prior to application, an extremely smooth polymer film which is also stretchable has been found to be desirable as the support layer. Hence, stretchable films of low density polyethylene material carrying silicone release coatings have been employed in such applications, frequently at thicknesses of about 0.001"–0.005" (≈0.02–0.13 mm). We have also determined that for certain support layer materials it is not necessary that the stretchable film carry a silicone release coating, provided that it is prepared from a material having sufficiently low surface energy to demonstrate some inherent release properties such as, for example, linear low density polyethylene or other low modulus, high elongation polyolefin.

The adhesive layer, typically having a thickness between about 0.002"–0.005" (≈0.005–0.13 mm), can be formulated to exhibit adhesion under pressure at ambient temperature or, where desired, to develop sufficient tack to adhere to the surface of an article upon heating. This latter embodiment renders easier the storing and handling of the decals. Most preferably, as an integral film the adhesive layer will exhibit a tensile elongation >50%, preferably >100%, at ambient or slightly elevated temperatures.

Four basic types of adhesive layers have been investigated:

The first type contemplates using an adhesive which demonstrates permanent pressure sensitivity. As was observed above, such adhesives demand stringent care and control in their use and, accordingly, while operable, do not comprise preferred materials.

The second type involves thermosetting adhesives, for example, a cross-linked polyurethane, which are activated by heat and are cured either during or subsequent to the application of the decal to the surface of an article.

The third type employs an adhesive that is cured upon exposure to ultra-violet radiation and which is cured after the decal has been applied to an article surface.

It will be recognized that these second and third types of adhesives will be formulated such that they exhibit sufficient tack and cohesive strength in the uncured state to be transferable to an article surface as an integral film. In some instances it may even be necessary to apply some heat in order to develop sufficient tack to wet the surface of the article.

The fourth type comprises thermoplastic adhesives requiring the application of sufficient heat as the decal is brought into contact with the article surface to cause the adhesive layer to soften and bond to the surface. Thermoplastic polyurethanes are operable examples of such adhesives.

As employed herein, the term thermoplastic indicates that, upon heating, the adhesive softens and wets the adherend, and does not eliminate adhesive materials which are lightly crosslinked. Thus, it is common practice to incorporate crosslinkers in formulations of polyurethanes to improve their post-application chemical durability. For example, crosslinkers are frequently utilized in polyurethane latexes, dispersions, and emulsions to enhance their post-application resistance to water and high humidity environments. Those crosslinkers typically react with carboxyl functional groups in the urethane after the coating is dried. Bacote 20 and Tyzor TE are illustrative of such crosslinkers.

In summary, whereas any of the above four types of adhesives are operable, we prefer to use either a ultraviolet radiation curable adhesive, such as an epoxy functional oligomer and a hydroxyl functional polyol cured with a cationic ultra-violet initiator, or, more preferably, a thermoplastic adhesive.

As can be appreciated, when formulated for use in decals in ophthalmic applications, this adhesive layer must be optically clear, shelf-stable, transferable as an integral layer which maintains a tight and durable bond to both the article surface and the abrasion resistant coating, and must retain its clarity and adhesion upon long term aging in the ambient environment. Moreover, adhesion layers which are dye receptive and which can be dyed to transparent tints after application to an article surface are greatly preferred.

The abrasion resistant layer, typically having a thickness between about 0.002″–0.02″ ($\approx$0.05–0.51 mm), must display sufficient stretch, either at ambient temperature or slightly above, to be compatible with the transfer process. Consequently, in general the abrasion resistant layer will comprise a material exhibiting a $Tg < 50°$, a tensile strength $> 1000$ psi, an elastic modulus $> 2{,}000$ psi, and a tensile elongation $> 50\%$, preferably $> 100\%$, at ambient or slightly elevated temperatures. Such abrasion resistant layers have been conveniently prepared from cross-linkable polyurethanes.

In like manner to the adhesive layers, when formulated for use in decals in ophthalmic applications, the abrasion resistant layers must be optically clear, shelf-stable, transferable as an integral layer, and must retain their clarity upon long term aging in the ambient environment. Also, abrasion resistant layers which are dye receptive, and which can be dyed to transparent tints after being applied to an article surface, are greatly preferred.

The construction of the inventive decals permits the inclusion of a design or decoration layer comprised of pigmented inks between the abrasion resistant layer and the adhesive layer, thereby taking advantage of the protection from chemical and physical abuse afforded by the abrasion resistant layer.

The optional second support layer can be prepared in like manner to the principal support layer. Customarily, it will be a non-stretchable film which si removed before the decal is applied. Frequently, the layer will comprise a polymer film carrying a release coating thereon. It has been found, however, that a film of MYLAR® with no release coating thereon to facilitate separation from the adhesive, e.g., from a solvent- or dispersion-type thermoplastic urethane, performs very satisfactorily. The omission of a release coating eliminates the possibility of contamination therefrom and reduces cost.

Among the several advantages resulting from the present decal construction, two of very practical significance are worthy of note:

First, the inventive construction enables blanks of circular for ophthalmic applications) and other configurations to be cut from laminated sheets, which blanks can be stored as individual units. For example, in applications to ophthalmic lenses, circular decal blanks can simply be held within a circular clamp during the pressing step.

Second, again directed to ophthalmic lenses, due to the ease of storing pre-cut blanks, those blanks can be pre-tinted in various shades, thereby eliminating the need to tint after the decal has been applied. Hence, if the coating can be tinted only after application to the article surface, compatibility with dyes currently employed by opticians becomes essential in order to avoid both the need to stock additional dyes an to engage in increased cleaning of the equipment used in tinting.

DESCRIPTION OF PREFERRED EMBODIMENTS

Figure 1:
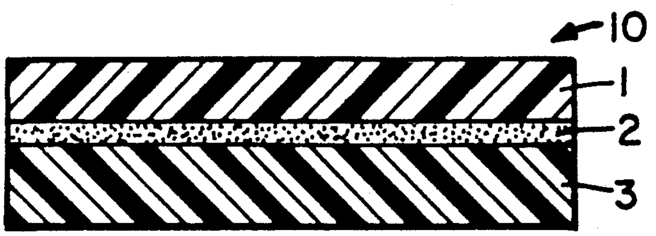
FIGS. 1–3 constitute fragmented illustrations in cross section of four embodiments of the inventive laminate constructions.

FIG. 1 depicts the three layer decal construction basic to the present invention. As was explained above, whereas the support layer can be utilized in contact with either the abrasion resistant layer or the adhesive layer, the preferred embodiment contemplates placing the support layer contiguous with the adhesive layer. FIG. 1 describes that preferred embodiment. Hence, as is illustrated therein, three laminae decal 10 consists of the following elements:

(a) Support layer 1 comprises a disposable release film which functions to protect the subjacent adhesive layer 2 from contamination (and possibly adhering to articles brought into contact therewith) until the time for applying the decal. Thus, immediately prior to the decal being applied, layer 1 is removed. As was observed above, support layer 1 can be any of a variety of commercially available, ultra-smooth release films such a, for example, a film of MYLAR® which may or may not carry a release coating.

(b) As was explained above, adhesive layer 2 can be prepared from a material which exhibits adhesion under pressure at room temperatures, or, where desired, demonstrates sufficient tack upon heating to adhere to an article surface. Nevertheless, whereas adhesive layer 2 can be formulated from permanent pressure sensitive materials and thermosetting polymers, the use of thermoplastic adhesives or ultra-violet radiation curable adhesives is preferred.

(c) Lamina 3 represents the stretchable abrasion resistant coating. In the preferred embodiment, adhesive layer 2 and abrasion resistant layer 3 will be capable of being stretched as an integral multi-layered film to an elongation greater than 50%, preferably greater than 100%, at room or slightly elevated temperature. That capability is particularly advantageous in applying the inventive decals to the concave faces of ophthalmic lenses, as will be illustrated hereinafter.

Commonly, adhesive layer 2 will either be applied as a liquid onto abrasion resistant lamina 3 and then dried and cured thereon, or will be applied to support layer 1 and laminated with abrasion resistant layer 3 by passing the laminae between a pair of heated laminating rolls.

Desirably, layer 3 will be relatively thick, i.e., about 0.005"-0.02" (≈0.13-0.51 mm), for handleability as an independent film, and will commonly be either extruded or cast onto a highly polished surface and cured thereon. After curing the film will be stripped from the polished surface. This thicker abrasion resistant layer construction is most compatible with the type of decals specifically designed to provide good impact resistance to ophthalmic lenses.

Figure 2:
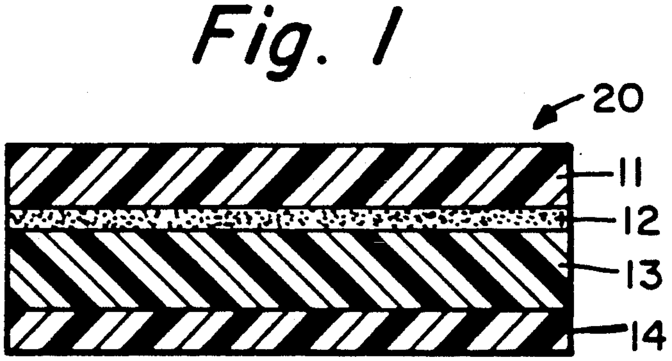

FIG. 2 depicts a four layer decal construction comprising the three laminae illustrated in FIG. 1, with a protective, disposable release layer atop the abrasion resistant layer. Hence, the decal structure 20 represented in FIG. 2 consists of four elements, viz.:

(a) A disposable support layer 11, corresponding to support layer 1 of decal 10.

(b) Adhesive layer 12, corresponding to adhesive layer 2 of decal 10.

(c) Abrasion resistant layer 13, corresponding to abrasion resistant layer 3 of decal 10.

(d) Support or protective layer 14 comprising a disposable release film comparable to support layer 1 of decal 10. Layer 14, which may optionally have a release coating thereon, protects abrasion resistant lamina 13 and may be prepared from either a stretchable material which is removed after decal 20 has been applied to an article surface or from a non-stretchable material which is removed prior to applying decal 20 to an article surface.

Several alternative methods for producing the basic structure described in FIG. 2 can be utilized. To illustrate:

(a) The abrasion resistant layer 13 can be applied onto support layer 14 in the form of a liquid, and subsequently dried and cured thereon. Adhesive layer 12 can then be applied as a liquid superjacent to the abrasion resistant layer and dried and cured (if necessary) thereon.

(b) Adhesive layer 12 can be applied as a liquid onto support layer 11 and dried and cured (if necessary) thereon. Thereafter, adhesive layer 12 and abrasion resistant layer 13 are laminated together by passing the separately prepared films on their respective support layer through a set of heated laminated rolls.

In the above two embodiments the abrasion resistant layer 13 can be quite thin, e.g., 0.002" (≈0.05 mm).

Figure 3:
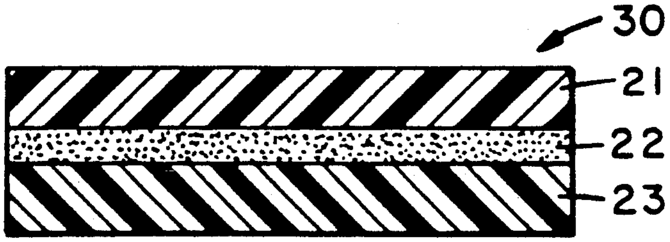

(c) Abrasion resistant layer 13 can be prepared by casting as a liquid onto a highly polished surface, usually a metal or glass surface. After drying and curing, the resultant film is stripped from the casting surface and combined with support layer 14. Abrasion resistant layer 13 and adhesive layer 12 can thereafter be laminated together employing either method (a) or method (b) described above. FIG. 3 depicts another three laminae decal construction 30, consisting of the following components:

(a) A disposable support layer 21, corresponding to support layer 1 of decal 10.

(b) A combination adhesive/abrasion resistant layer 22.

(c) A disposable support or protective layer 23, corresponding to support layer 14 of decal 20.

This decal construction contemplates the formulation of material(s) combining the functions of the adhesive layer and the abrasion resistant layer. Hence, the material(s) will perform as an adhesive layer, while concurrently displaying the properties required of an abrasion resistant layer. To illustrate, a high viscosity urethane oligomer can e formulated which demonstrates, in the uncured or partially cured state, characteristics demanded in an adhesive layer, but which, upon curing, e.g., through either exposure to ultra-violet radiation or elevated temperature, exhibits excellent abrasion resistance. Although not exhibiting as good abrasion resistance as the urethane, an epoxy functional oligomer with a hydroxyl functional polyol can also be formulated to function as an adhesive layer followed by curing to a durable coating upon exposure to ultra-violet radiation. In this embodiment a cationic photoinitiator is used. In contrast, where an ultra-violet radiation curable urethane is employed, an acrylated oligomer and an acrylated monomer are utilized such that a free radical photoinitiator is required in curing. Rather than utilizing an integral film combining the properties required for both adhesion and abrasion resistance, the material(s) can be applied as a coating on the support layer 23 by means of such well known techniques as doctor blading, roll coating, and flood coating, and then dried thereon. Where the material(s) can be cured through exposure to ultra-violet radiation, a stretchable support layer will be employed. Partial curing will customarily be carried out before removing support layer 23 in order to assure a smooth surface on the decal.

The use of a stretchable support layer 23 is advantageous where an abrasion resistant/adhesive layer is utilized which is cured through exposure to ultra-violet radiation. Thus, after removal of support layer 21 and applying decal 30 to an article surface, abrasion resistant/adhesive layer 22 is partially cured through exposure to ultra-violet radiation before stretchable support layer 23 is removed. That is, the ultra-violet radiation passes through support layer 23 to initiate curing of abrasion resistant/adhesive layer 22. (It will be appreciated that support layer 23 must be at least partially transmissive to ultra-violet radiation). That practice imparts two practical benefits; viz., further protection against contamination and easier trimming of the edges of the decal. Hence, the partial curing imparts rigidity to the decal, thereby placing it in a state such that it can be readily trimmed, e.g., by cutting manually with a razor-like blade. After removal of support layer 23, abrasion resistant/adhesive layer 22 is fully cured via further exposure to ultra-violet radiation or through the application of heat.

Figure 4:
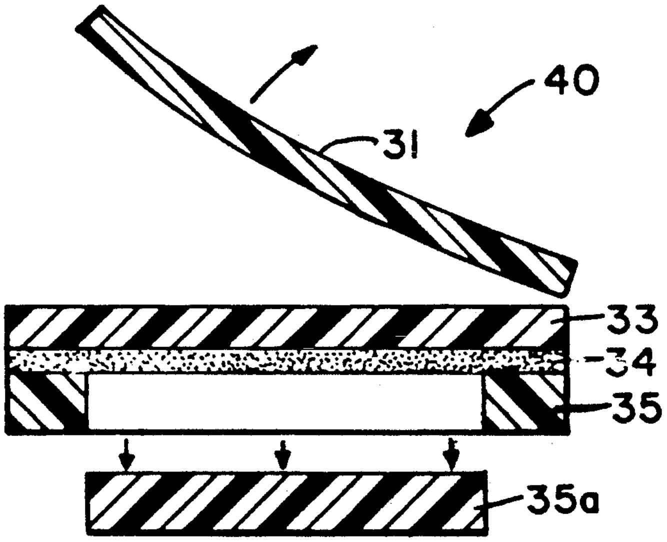
FIG. 4 schematically illustrates the practical utility of one embodiment of the inventive construction in its application to the surface of an article, e.g., the concave surface of an ophthalmic lens.

FIG. 4 illustrates the use of a decal having a construction as pictured in FIG. 2 for application to the concave face of an ophthalmic lens. Thus, as is represented there, decal 40 consists of:

(a) a relatively thin, e.g., 0.001"-0.005" (≈0.03-0.13 mm), disposable top layer 32 comprised, for example, of a film or MYLAR® carrying a silicone coating designed to effect easy release;

(b) a stretchable abrasion resistant layer 33 comprised, for example, of a cross-linked polyurethane elastomer;

(c) a stretchable adhesive layer 34 comprised, for example, of a blend of thermoplastic urethane resins doctor bladed onto; and (d) a relatively thick, e.g., 0.005"-0.02" (≈0.13-0.51 mm), disposable, support layer 35 comprised, for example, of a film of MYLAR® carrying a silicone coating designed to effect release, but only upon the application of greater effort than required in the release of top layer 32.

In operation with conventional ophthalmic lenses, a circular section 35a having a diameter of 3" (≈7.6 cm) is die cut through support layer 35, thereby allowing exposure of adhesive layer 34 upon removal of the die cut portion 35a. The periphery portion remaining of support layer 35 provides a support frame for holding the decal during the subsequent pressing step onto a lens. This periphery portion holds the decal flat and allows handleability and easy insertion in a clamping fixture for pressing onto a lens.

The following outlines a general procedure for applying the inventive decals having the construction pictured in FIG. 4 onto the concave surface of an ophthalmic lens:

(1) the lens surface is cleaned thoroughly and the lens then placed onto a supporting base (not shown);

(2) where adhesion is to be achieved through the application of heat, the lens and the supporting base will be heated to the proper temperature;

(3) top layer 31 is stripped off decal 40;

(4) previously die cut circular section 35a is removed from support layer 35 thereby leaving the remaining periphery portion of support layer 35 and exposing the center portion of adhesive layer 34;

(5) decal 40 is clamped through periphery portion of support layer 35 into a decal holder (not shown) with adhesive layer 34 facing the lens;

(6) decal 40 is pre-stretched through the decal holder with a lower durometer elastomeric pad;

(7) pre-stretched decal 40 is pressed onto the lens surface by means of said elastomeric pad;

(8) the elastomeric pad is raised from the top of decal 40;

(9) the lens with decal 40 is removed from the supporting base and unclamped from the decal holder; and

(10) the excess decal 40 is trimmed from around the edges of the lens.

SPECIFIC EXAMPLE

A decal having the structure of decal 10 illustrated in FIG. 1 was prepared as follows:

Support layer 1 comprised a commercial silicone-coated Mylar film having a thickness of about 0.002" (≈0.051 mm). Transfer or adhesive layer 2 consisted of the blend of two water-based thermoplastic urethane resin dispersions plus additives set out below in terms of weight percent doctor bladed onto layer 1 and dried.

| | | |
|---|---|---|
| NeoRez R-9314 | Resin (40% solids) | 36 |
| NeoRez XR-9614 | Resin (35% solids) | 36 |
| FC-109 | Wetting Agent | 0.5 |
| Bacote-20 | Crosslinker | 1 |
| DC-25 | Adhesion Promoter | 1 |
| M-Pyrol | Solvent | 5.5 |
| Water | Solvent | 20 |

The resin dispersions were purchased from ICI Americas, Wilmington, Del. FC-109 is a fluorochemical surfactant marketed by the 3M Company, St. Paul, Minn., under the trademark FLUORAD. It lowers the surface tension of the liquid formulation and facilitates good wetting of the liquid on the abrasion resistant film. The Bacote-20 crosslinker is an ammonium zirconium carbonate solution from Magnesium Elektron, Inc., Flemington, N.J., which acts to increase the cohesive strength of the adhesive layer after it is applied. The DC-25 adhesive promoter is a paint additive from Dow Corning, Midland, Mich., which strengthens the bond between the adhesive and the glass. Finally, in order to produce a thin adhesive layer via manual doctor blading, the formulation was diluted with a solvent system consisting of a mixture of M-Pyrol (N-methyl-2-pyrollidone) from GAF Corporation, Wayne, N.J., and water at a ratio of approximately 1:4. The viscosity at that dilution yields an adhesive layer having a dried thickness of about 0.002" (≈0.05 mm).

The most preferred abrasion resistant film is a cross-linked polyurethane elastomer, Krystalgard KR-4781A, marketed by K. J. Quinn & Company, Malden, Mass.

Inasmuch as adhesion to the ware surface, e.g., the concave surface of an ophthalmic lens is brought about through the application of heat, the surface of the ware (and any supporting base therefor where necessary) will commonly be heated to a desired temperature, e.g., about 300° F. (≈149° C.). It is often advantageous to overheat by 25°-55° F. (≈15°-30° C.) in order to compensate for heat loss resulting through contact with the unheated decal and the elastomeric transfer pad. In general, a contact time of at least two minutes will be employed to assure adhesion activation and subsequent cooling of the decal before removal of the elastomeric pad.

We claim:

1. A laminated heat release or pressure release decal for application to a surface of an article which comprises:

(a) a support layer comprising a disposable release film;

(b) an abrasion resistant layer exhibiting a tensile elongation greater than 50%; and (c) a heat activated or pressure sensitive adhesive layer atop said abrasion resistant layer.

2. A laminated decal according to claim 1 wherein said support layer comprises an extremely smooth polymer film carrying a release coating thereon.

3. A laminated decal according to claim 2 wherein said support layer has a thickness between about 0.001"-0.02" (≈0.03-0.51 mm).

4. A laminated decal aborting to claim 3 wherein said support layer comprises a polyethylene terephthalate material carrying a silicone release coating.

5. A laminated decal according to claim 3 wherein said support layer when in contact with said abrasion resistant layer comprises an extremely smooth polymer film exhibiting a tensile elongation greater than 50% having a thickness of about 0.001"-0.005" (≈0.03-0.13 mm) and carrying a release coating thereon.

6. A laminated decal according to claim 5 wherein said support layer consists of a low density polyethylene material.

7. A laminated decal according to claim 1 wherein said support layer comprises an extremely smooth polymer film having a thickness of about 0.001"-0.02" (≈0.03-0.51 mm) consisting of a material having sufficiently low surface energy to demonstrate inherent release properties.

8. A laminated decal according to claim 7 wherein said support layer is selected from the group consisting of a linear low density polyethylene or polyethylene terephthalate.

9. A laminated decal according to claim 1 wherein said abrasion resistant layer is a polyurethane exhibiting a Tg<50° C.

10. A laminated decal according to claim 1 wherein said abrasion resistant layer is a polyurethane about 0.002"-0.02"(≈0.05-0.51 mm).

11. A laminated decal according to claim 1 wherein said abrasion resistant layer is optically clear and which retains that clarity upon long term aging in the ambient environment.

12. A laminated decal according to claim 11 wherein said abrasion resistant layer is dye receptive and which can be dyed to transparent tints after application to the surface of an article.

13. A laminated decal according to claim 1 wherein said adhesive layer comprises a thermosetting polymer.

14. A laminated decal according to claim 13 wherein said thermosetting polymer is a cross-linked polyurethane.

15. A laminated decal according to claim 1 wherein said adhesive layer comprises a thermoplastic polymer.

16. A laminated decal according to claim 15 wherein said thermoplastic polymer is a polyurethane.

17. A laminated decal according to claim 1 wherein said adhesive layer comprises a pressure sensitive adhesive exhibiting sufficient room temperature tack to bond said abrasion resistant layer to the surface of an article through the application of pressure to said decal.

18. A laminated decal according to claim 17 wherein said pressure sensitive adhesive is cured by being subjected to heat or ultra-violet radiation.

19. A laminated decal according to claim 18 wherein said pressure sensitive adhesive cured by being subjected to ultra-violet radiation is either an epoxy functional oligomer and a hydroxyl functional polyol cured with a cationic photoinitiator or an acrylated urethane oligomer and an acrylated monomer cured with a free radical photoinitiator.

20. A laminated decal according to claim 1 wherein said adhesive layer has a thickness between about 0.0002"-0.005" (≈0.005-0.13 mm).

21. A laminated decal according to claim 1 wherein said adhesive layer is optically clear and retains that clarity upon long term aging in the ambient environment.

22. A laminated decal according to claim 21 wherein said adhesive layer is dye receptive and which can be dyed to transparent tints after application of the surface of an article.

23. A laminated decal according to claim 1 also containing a design layer comprised of pigmented inks between said abrasion resistant layer and said adhesive layer.

24. A laminated decal according to claim 1 also having a second support layer comprising a disposable release film which is located on the side opposite from the first support layer.

25. A laminated decal according to claim 24 wherein said second support layer is adjacent to the adhesive layer, has a thickness between about 0.005"-0.02" (≈0.13-0.51 mm), and is die cut through the thickness thereof into a geometric shape.

26. A laminated decal according to claim 25 wherein said die cut geometric shape is removed from said release layer and the peripheral portion of said release layer provides a support frame for holding said decal during application thereof to an article.

27. A laminated decal according to claim 24 wherein said abrasion resistant layer and said adhesive layer are combined into a single layer.

28. A laminated decal according to claim 27 wherein said combination of abrasion resistant layer and adhesive layer comprises either a high viscosity acrylated urethane oligomer or an epoxy functional oligomer and a hydroxyl functional polyol, each capable of being cured through exposure to ultra-violet radiation.

29. A laminated decal according to claim 27 wherein one of said support layers comprises an extremely smooth polymer film exhibiting a tensile elongation greater than 50%.

* * * * *